US007059252B2

(12) United States Patent
Guardo, Jr.

(10) Patent No.: US 7,059,252 B2
(45) Date of Patent: Jun. 13, 2006

(54) MAGNETIC LEVITATION CAR

(75) Inventor: Jose L. Guardo, Jr., Cebu (PH)

(73) Assignee: Maglevvison Corporation, Manila (PH)

( * ) Notice: Subject to any disclaimer, the term of this patent is extended or adjusted under 35 U.S.C. 154(b) by 28 days.

(21) Appl. No.: 10/499,397

(22) PCT Filed: May 20, 2003

(86) PCT No.: PCT/PH03/00005

§ 371 (c)(1),
(2), (4) Date: Jun. 17, 2004

(87) PCT Pub. No.: WO03/103995

PCT Pub. Date: Dec. 18, 2003

(65) Prior Publication Data

US 2004/0261649 A1     Dec. 30, 2004

(51) Int. Cl.
*B60L 13/00*     (2006.01)
(52) U.S. Cl. ...................... 104/281; 104/282; 104/283; 104/286

(58) Field of Classification Search .............. 104/281, 104/282, 283, 284, 286, 290, 291, 292; 310/12
See application file for complete search history.

(56) References Cited

U.S. PATENT DOCUMENTS 5,263,419 A  *  11/1993  Moroto et al. ............. 104/290
6,510,799 B1 *  1/2003  Lamb et al. ................ 104/281

FOREIGN PATENT DOCUMENTS

JP           61-1206     *   1/1986

* cited by examiner

*Primary Examiner*—Mark T. Le
(74) *Attorney, Agent, or Firm*—Walter J. Tencza, Jr.

(57) ABSTRACT

A magnetic levitated car comprising a car body that is made to float on a magnetic road laid on with a plurality of spaced apart magnets, at least one magnetic suspension stabilizer disposed spacedly at the bottom of said car body, and at least one electro-magnetic wheel provided at the bottom of said car body. The bottom portion of said magnetic suspension stabilizer has a polarity similar to that of the magnets laid on the road to provided repulsion therefore that will levitate said car body.

23 Claims, 5 Drawing Sheets

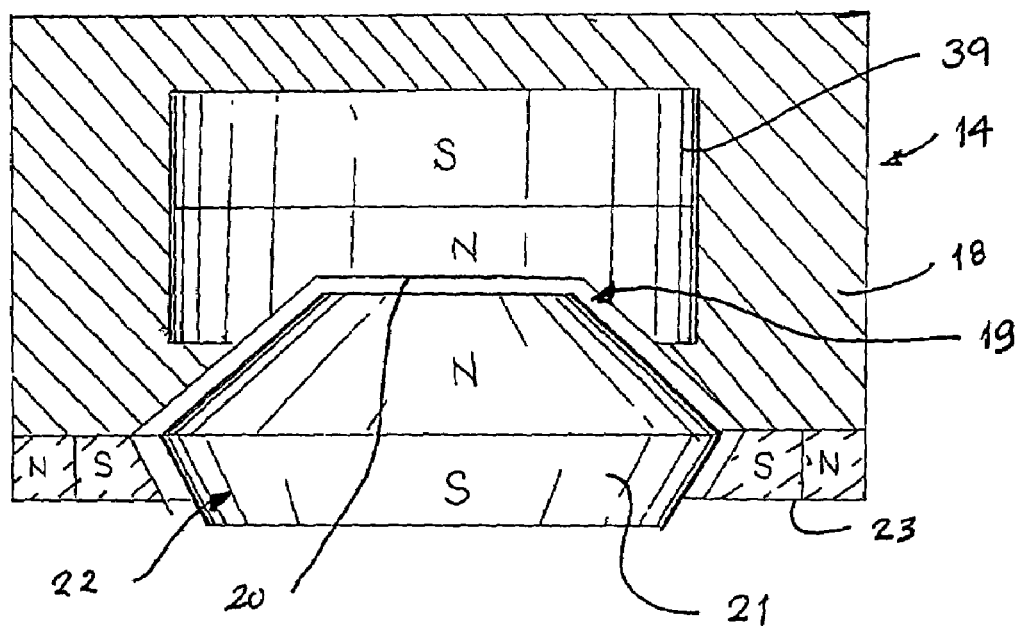
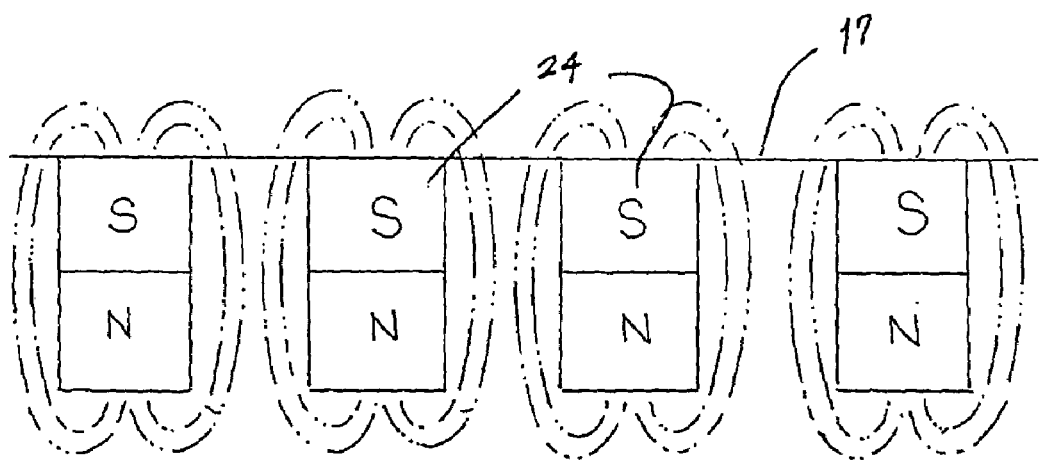
Fig. 3

MAGNETIC LEVITATION CAR

FIELD OF INVENTION

The present invention relates generally to magnetic levitation system but more particularly to a magnetic levitation car that runs on a magnetized road.

BACKGROUND OF THE INVENTION

The concept of a magnetic levitation train has been around for than 60 years now. This was a brainchild of a German Scientist Hermann Kemper. On Aug. 14, 1934, he received a patent for the magnetic levitation of trains in Germany.

In the mid 1900s, Britain became the first country to introduce a magnetic levitation service. It was to link two terminals at Birmingham airport about 400 meters long and a top speed of about 10-mph. However it was recently replaced with a bus service due to difficulty of getting spare parts.

Since then, there has been a lot of research and experiments for Magnetic Levitation Trains. In Germany, the TRANSAPID project is one intended to connect Berlin and Hamburg using this principle. If it all works on time then it should be operational by 2005. The journey time will be no more than 60 minutes for the 292-km giving rise to an impressive 292 kph average speed.

In Japan, after fundamental tests in the laboratory to verify the feasibility of high-speed running at 500 kph, the construction work of a 7-km test track began in Japan's Miyazaki Prefecture in 1975. The manned two-car vehicle registered a speed of 400.8 kph in 1987. In 1997, the project in a three-car train set achieved world speed records, attaining a maximum speed of 531 kph in a manned vehicle run on December 12 and a maximum speed of 550 kph in an unmanned vehicle on December 24. On Apr. 14, 1999, a five-car train set surpassed the speed record, attaining a maximum speed of 552 kph in a manned vehicle run.

The principle of a magnetic train is that it floats on a magnetic field and is propelled by a linear induction motor. They follow guidance tracks with magnets. These trains are often referred to as Magnetically Levitated, which is abbreviated, to Maglev.

Maglev is a system in which the vehicle runs levitated from the guide way (corresponding to the rail tracks of conventional railways) by using electromagnetic forces between super conducting magnets on board the vehicle and coils on the ground. A maglev train floats about 10 mm above the guide way on a magnetic field. It is propelled by the guide way itself rather than an onboard engine by changing magnetic fields. Once the train is pulled into the next section the magnetism switches so that the train is pulled on again. The Electro-magnets run the length of the guide way.

The primary advantage of a magnetic levitated train is maintenance. Because the train floats along there is no contact with the ground and therefore no need for any moving parts. As a result there are no components that would wear out. This means that trains and track would need no maintenance at all. The second advantage is that because maglev trains float; there is no friction and noise. And finally, the speed as a result it is more viable for said maglev trains to travel extremely fast, i.e. about 500 kph.

However, there are several disadvantages with maglev trains. Maglev guide paths are bound to be more costly than conventional steel railways. The other main disadvantage is lack with existing infrastructure. For example, if a high-speed line between two cities is built, then high-speed maglev trains can only serve both cities but would not be able to serve other lines or normal railways branching out therefrom which require normal speed. This means that maglev trains are strictly limited only to high-speed lines and not flexible enough to serve other lines. Although the Maglev technology has been around for quite some time now, however its application was concentrated on the use of trains.

After a careful and thorough research and conceptualization of the Principle of Magnetic Levitation, a break through technology has been adapted wherein such principle is applied to cars. This off the railroad application of Maglev Technology will certainly transform the way people move in the future.

Basically the concept and propulsion between the Maglev trains the Maglev car may seem similar, but they work differently from each other. Unlike the Maglev train, which run and work only on a Maglev rail track in a very limited route whereby its movement and direction is very limited, the Maglev car on the other hand works like an automobile, and can freely move anywhere it goes, and with distinct feature and characteristic wherein it can move in an Omni directional manner.

The primary object of this invention therefore is to provide a Magnetic Levitated car that solves the drawbacks inherent to the existing Maglev trains.

Another object of this invention is to provide a Magnetic Levitated car that runs on magnetic roads, uses magnets instead of tires and runs by means of batteries instead of gas, Still an object of this invention is to provide a Magnetic Levitated car that is environment friendly since no air pollutants that comes off the car nor noise that is being produced thereof.

Yet, an object of this invention is to provide a Magnetic Levitated car having a polarity similar to the polarity of the magnetic roads that when engaged, the car floats or suspended in mid-air.

A further object of this invention is to provide a Magnetic Levitated car having electro-magnetic wheels that uses the opposite polarity with respect to the polarity of the magnetic road in an "off" and "on" manner. This will cause an attraction intermittently creating therefore movement from one point to another point in one direction or to a different direction as to turning, depending on the rotation of the electro-magnetic wheels.

These and other objects and advantages will come to view and be understood upon a reading of the detailed description when taken in conjunction with the accompanying drawings.

FIG. 3 is a sectional view of the magnetic suspension stabilizer and the magnetic road showing the levitation thereof;

DETAILED DESCRIPTION

Figure 1:
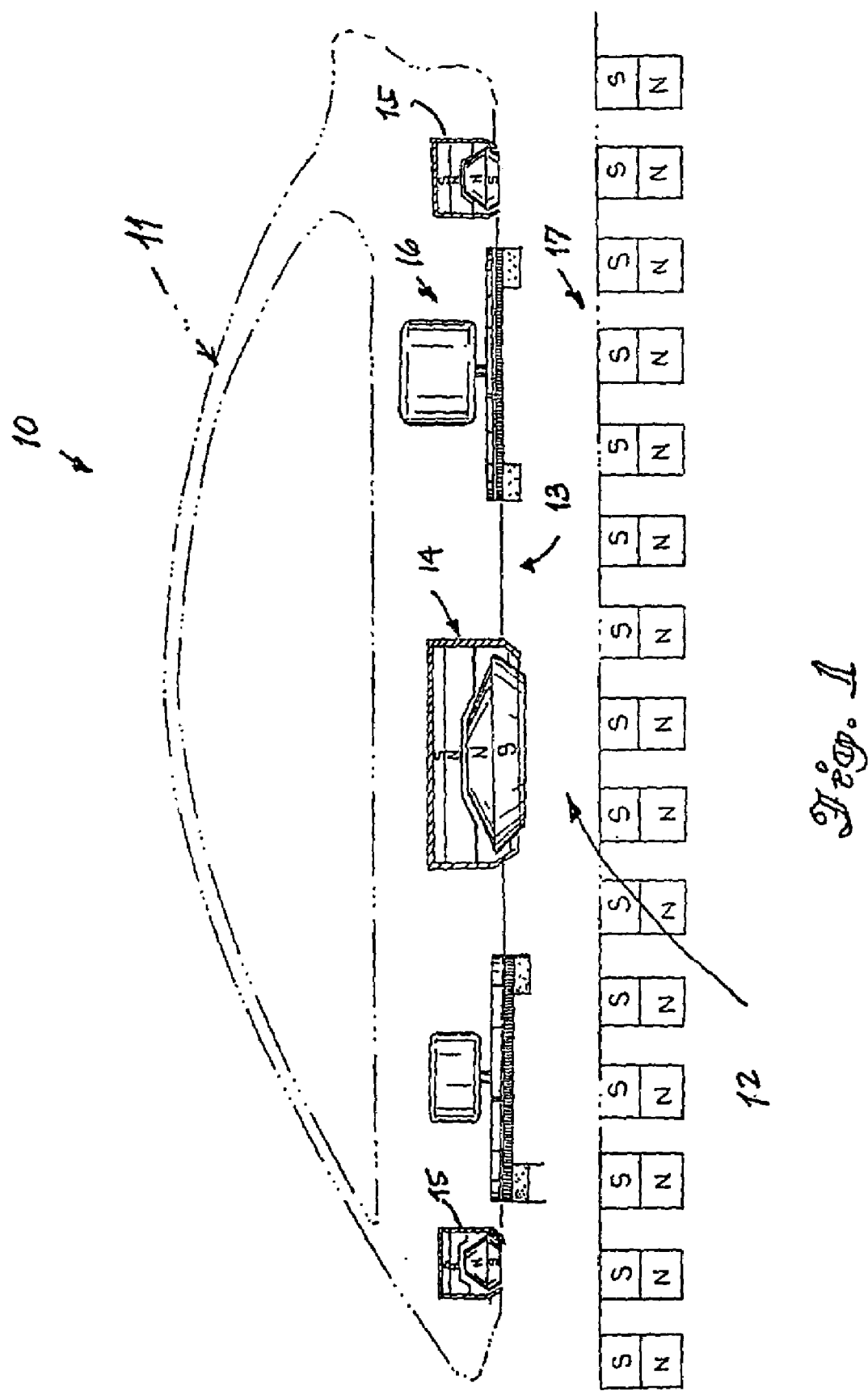
FIG. 1 is a perspective view of the present invention for a Magnetic Levitated car.

Referring now to the several views of the drawing, shown is magnetic levitated car generally designated as reference numeral 10.

Said magnetic levitated car 10 comprises a car body 11 (shown in dotted lines) and a magnetic levitation system 12 disposed at the bottom portion 13 of said car body 11.

Figure 2:
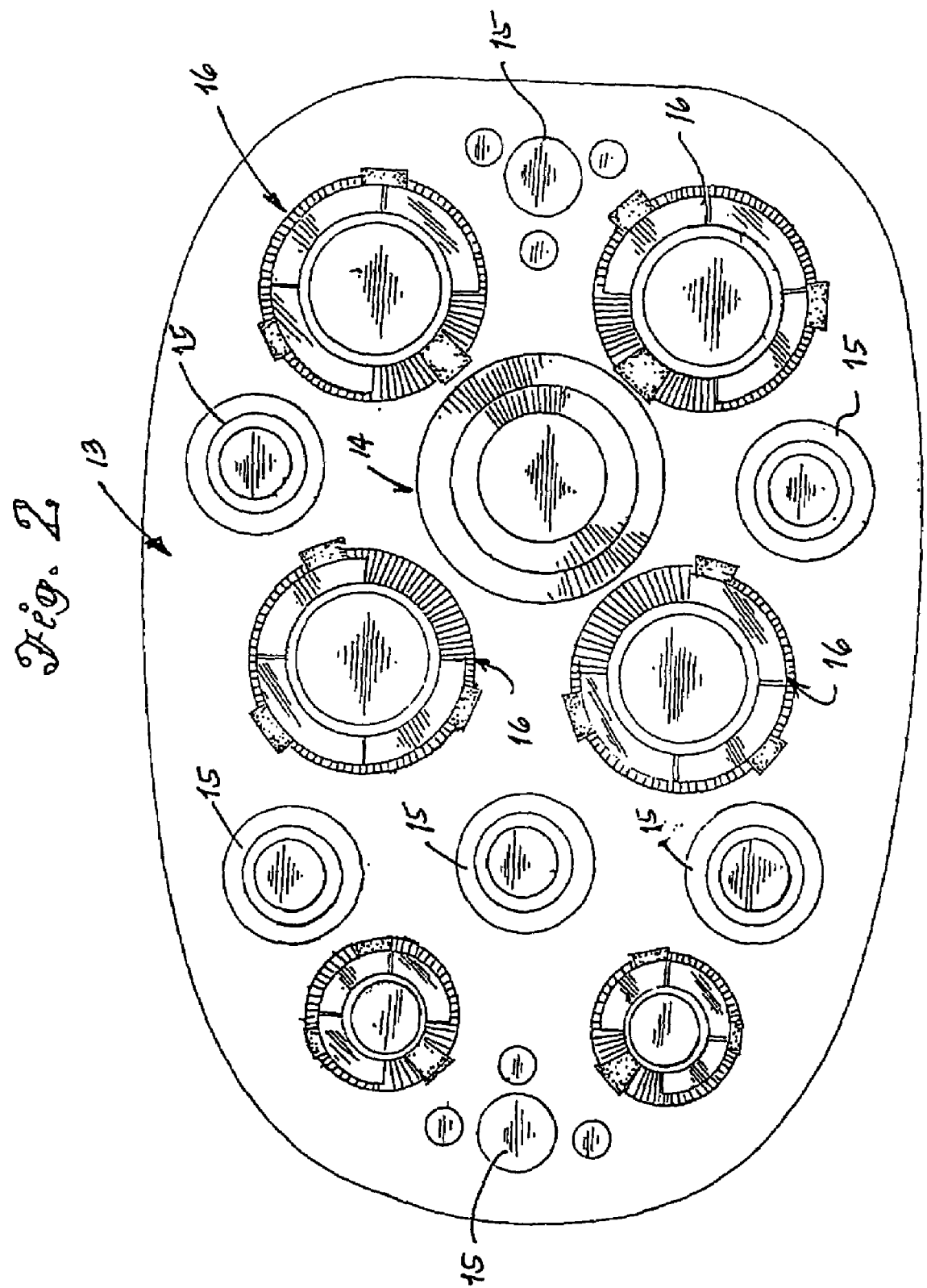
FIG. 2 is a plan view of the disposition of the magnetic suspension stabilizers and electromagnetic wheels at the bottom of the car.
Figure 4:
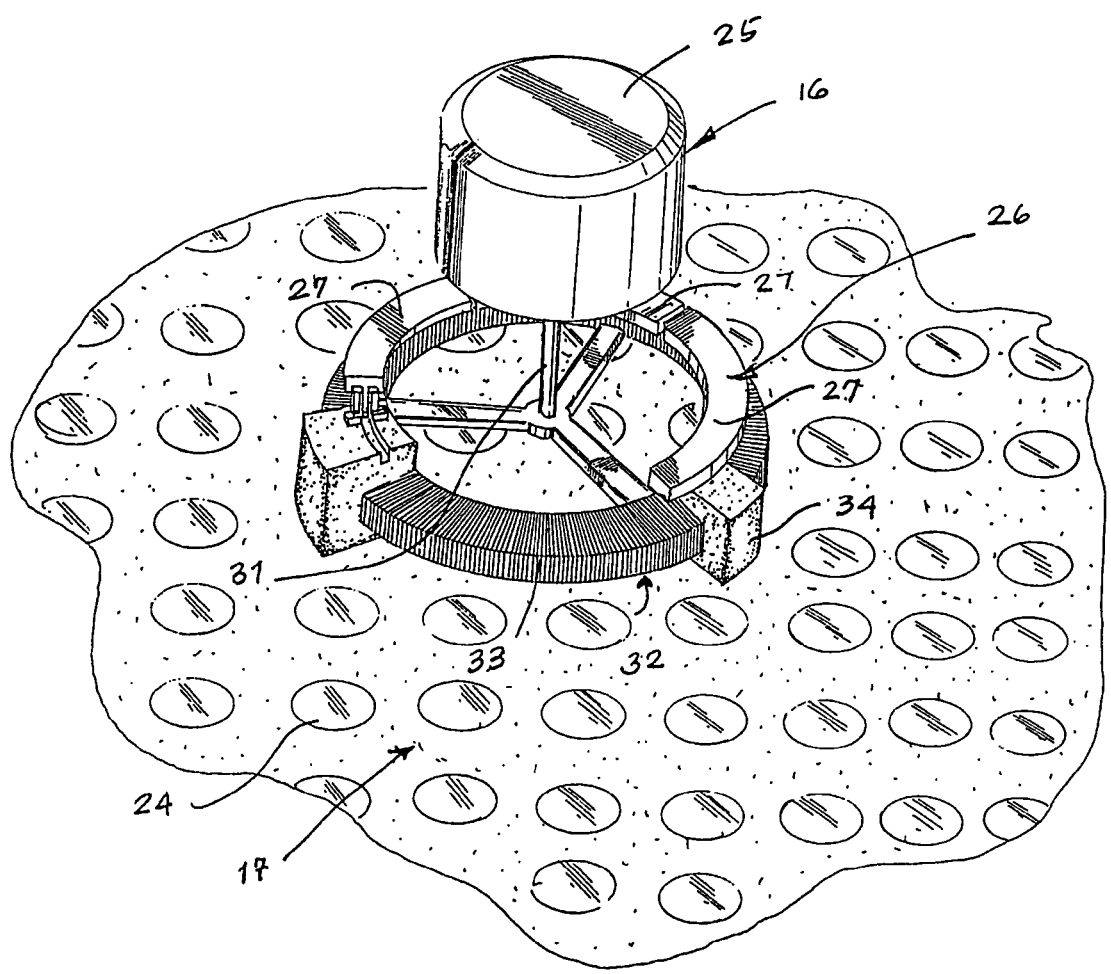
FIG. 4 is an illustrative view of the electro-magnetic wheel in relation with the magnetic road.
Figure 5:
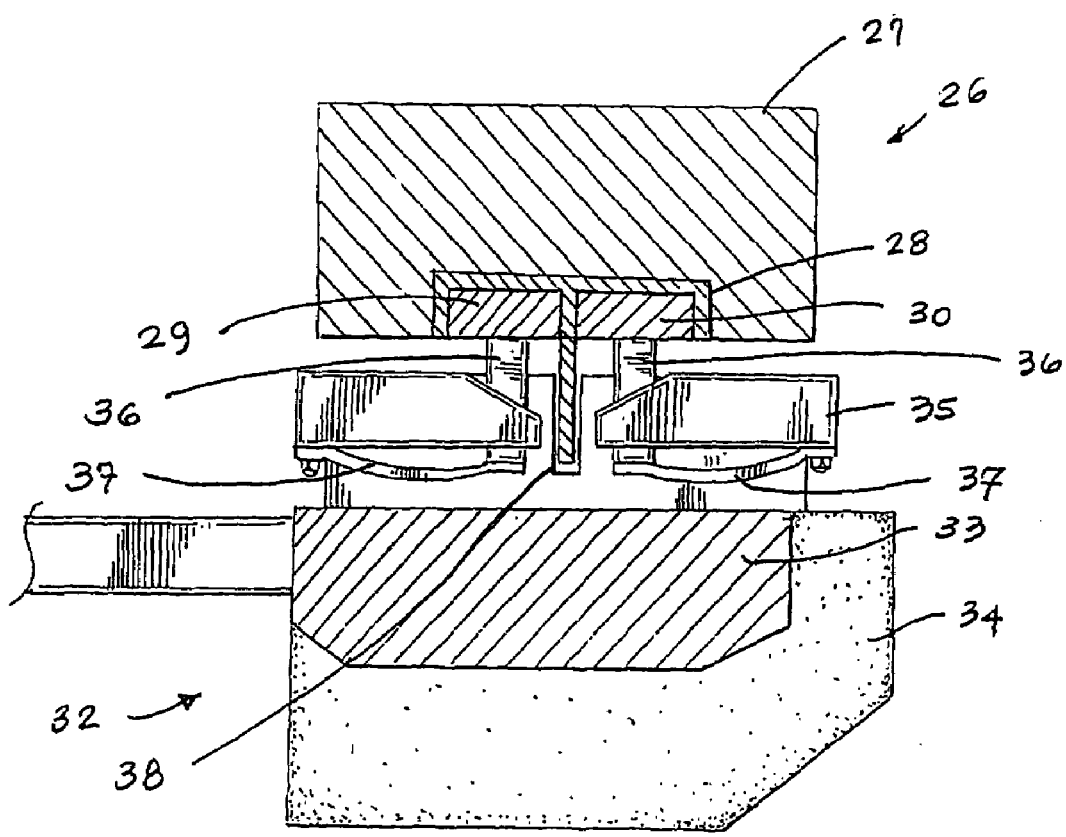
FIG. 5 is sectional view of the electromagnetic wheel.

Said magnetic levitation system 12 consists of a main magnetic suspension stabilizer 14 disposed centrally at the bottom portion 13 of said car body 11, a plurality of small magnetic suspension stabilizer 15 spacedly disposed around said main magnetic suspension stabilizer 14 preferably along the sides to provide stability preventing the car body 11 from tilting, a plurality of electro-magnetic wheels 16 spacedly disposed in a predetermined location around said magnetic suspension stabilizers as shown in FIG. 2, and a magnetic track 17 having a plurality of magnets spacedly spread out along a track having their polarity facing the same polarity with that of the magnetic suspension stabilizer thereby repelling each other to provide levitation therefore.

Said main and small magnetic suspension stabilizers 14 and 15 are preferably made of permanent magnets and the like such as Neodymium Iron Boron, Samarium Cobalt and the like, and each of said stabilizers is being defined by a suspension stabilizer housing 18 confining a magnetic crown 39 having a circular cavitation 19 at the bottom surface 20 that receives a frusto-conical shaped magnetic core 21 therein. As shown in the drawing the magnetic crown 39 has its bottom polarity, i.e. the circular cavitation 19 similar to the adjacent polarity of the magnetic core 21, say the upper portion of the magnetic crown 39 has a south polarity while the opposing side or circular cavitation 19 has the north polarity. The upper portion of the magnetic core 21 has likewise the north polarity such that circular cavitation 19 would push or repel the upper portion of the magnetic core 21. The bottom portion 22 of the magnetic core 21 therefore possesses the south polarity. To secure the magnetic core 21 suspended in mid-air, a bottom magnetic ring 23 is lockably secured at the bottom of the suspension stabilizer housing 18. The bottom magnetic ring 23 likewise has its nearest polarity similar to the bottom portion 22 of the magnetic core 21, in this case, the South Pole. With this set up, the magnetic core 21 is suspended in mid-air inside the suspension stabilizer housing 18 causing it therefore to freely move or rotate. Should there be any disturbance caused by outside forces which would cause the car body 11 to be outbalanced or tilt, the magnetic suspension stabilizer would actually absorb such. This would prevent said car body from tilting or being outbalanced.

As shown in FIGS. 1 and 2, the whole car 10 is floating above the magnetic track 16 being laid on with a plurality of equally spaced magnetic elements 24 having the same material as that of the stabilizers. The upper side of said magnetic elements 24 are laid on said track with the exposed sides having a similar polarity with that of the bottom portion 22 of said magnetic core 21. In as much that the bottom portion 22 of said magnetic core 21 has the south polarity, the upper side of said magnetic elements 24 also have the same south pole thereby repelling the magnetic core 21 of said car 10.

To provide propulsion, said car 10 has electro-magnetic wheels 16 driven by prime moving means such as electric motor 25 which is run by batteries, preferably solar batteries. Said electric motor 25 is co-axially disposed with a commutator assembly 26 secured on said car body 11. Said commutator assembly 26 which is an arcuated member covering at least three quarters of a ring, consists of at least three (3) commutator housing 27 each covering one circumferential quadrant of a ring and being provided with a T-shaped commutator insulator 28 traversing the entire length of the bottom portion thereof, and a negative and a positive commutator 29 and 30 disposed at the opposing side of said T-shaped commutator insulator 28. Said electric motor 25 is provided with a shaft 31 centrally projecting therefrom and being rotatably connected with an armature assembly 32. Said armature assembly 32 in the form of a ring consists of at least three sectors of armature coils 33 electrically connected with respective electromagnetic foot 34. Said electromagnetic foot 34 being disposed in between two adjacent armature coils 33 is a metal plate attached to respective armature coil 33 and when charged with electricity, would be converted to electromagnet. Cantileveredly mounted on top of said electromagnetic foot 34 is a pair of opposing brush holder 35, respectively provided with brush 36 in a manner that the top portion of said brush 36 is engaged respectively with the negative and positive commutators 29 and 30. To ensure that the brushes 36 are always in contact with said commutators, said brushes 36 are supported at the bottom with respective leaf springs 37 that are secured on said electro-magnetic foot 34. In order to ensure that the brush and commutator are always in engagement position, the top portion of the electromagnetic foot 34 is provided with a guide way 38 whereby the lower end of the T-shaped commutator insulator travels 28.

In operation, while the armature assembly is being rotated by the electric motor, the armature is charged with electricity converting the electromagnetic foot to electromagnet. The magnetic field created would attract the magnetic road or track 17 and would push the vehicle either forward or backward depending on the rotation of the motor. As would be seen in the drawing, once the commutator is passed with electricity, the brush would transfer the electricity and charge the armature coil thereof. Since the commutators cover only three quarters, the remaining quarter is open which creates an interruption in the supply of electricity to the armature coils. This switching "on" and "off" of electricity in the armature coils actually makes the electromagnetic foot crawls the magnetic road or track.

The invention claimed is:

1. A magnetic levitated car adapted to run on a magnetic road comprising a car body, at least one magnetic suspension stabilizer disposed spacedly at the bottom of said car body, at least one electro-magnetic wheel provided at the bottom of said car body; and wherein a plurality of magnetic suspension stabilizers are spacedly provided along the bottom edges of said car body, each of said magnetic suspension stabilizers being defined by a suspension stabilizer housing confining a magnetic crown therein, a magnetic core suspended below said magnetic crown, with adjacent polarities of said magnetic crown and magnetic core being similar such that both the magnetic crown and magnetic core repel each other, and a magnetic ring securing said magnetic core, whereby the opposing polarity of the magnetic core being similar with the adjacent polarity of said magnetic ring such that the magnetic core and magnetic ring repel each other.

2. A magnetic levitated car according to claim 1
wherein said polarity of the magnetic cores being engaged with the similar polarity of said magnetic rings is similar to the polarity of the magnetic road such that said magnetic core is repelled therefore by said magnetic road.

3. A magnetic levitated car adapted to run on a magnetic road comprising a car body, at least one magnetic suspension stabilizer disposed spacedly at the bottom of said car body, and at least one electro-magnetic wheel provided at the bottom of said car body;

wherein said electro-magnetic wheel is comprised of a commutator assembly secured on said car body, a prime moving means co-axially disposed on said commutator assembly, and an armature assembly rotatably connected with said prime moving means;

wherein said commutator assembly comprises at least three commutator housings arranged to cover three circumferential quadrants of a circle, a T-shaped commutator insulator provided at the entire bottom length of said commutator housing, and a pair of commutators having opposing polarities respectively provided at the opposing side of said T-shaped commutator insulator.

4. A magnetic levitated car according to claim 3 wherein said electro-magnetic wheel is comprised of at least three armature coils, an electro-magnetic foot electrically connected to each of said armature coils and disposed between two armature coils, and a pair of spaced apart brushes engaged respectively with said pair of commutators.

5. A magnetic levitated car according to claim 4 wherein said brushes are being held by respective brush holders secured to said electro-magnetic foot, said pair of brushes being pushed to ensure engagement with said pair of commutators by respective leaf spring provided at the bottom portion thereof.

6. A magnetic levitated car according to claim 4 wherein said electro-magnetic foot is provided with a guide way through which an end portion of said T-shaped commutator insulator travels.

7. A magnetic levitated car comprising
a car body;
a first electromagnetic propulsion device disposed on the car body which can move the magnetic levitated car forward or backward along a magnetic track;
wherein the first electromagnetic propulsion device is comprised of
four arcuate armature coil sections which together substantially form a circular shape; and
and three commutator housings;
wherein one of the three commutator housings converting each of three of the four arcuate armature coil sections so that one of the four arcuate armature coil sections is not covered by any of the three commutator housings and such that there is a gap located above the arcuate armature coil section which is not covered by one of the three commutator housings and said gap is located between one of the three commutator housings and another of the three commutator housings.

8. The magnetic levitated car of claim 7 further comprising
one or more further electromagnetic propulsion devices disposed on the car body;
wherein each of the one or more further electromagnetic propulsion devices is comprised of four arcuate armature coil sections which together substantially form a circular shape, and three commutator housings;
wherein for each of the one or more further electromagnetic propulsion devices one of the three commutator housings cover each of three of the four arcuate armature coil sections sot that one of the four arcuate armature coil sections is not covered by any of the three commutator housings and such that there is a gap located above the arcuate armature coil section which is not covered by one of the three commutator housings and said gap is located between one of the three commutator housings and another of the three commutator housings.

9. The magnetic levitated car of claim 7 wherein the first electromagnetic propulsion device can move the magnetic levitated car in an omni-directional manner.

10. A magnetic levitated car comprising
a car body;
a first magnetic suspension stabilizer disposed on the car body;
wherein the first magnetic suspension stabilizer is comprised of
a magnetic crown having a first polarity and a second polarity;
a magnetic core having a first polarity and a second polarity; and
a magnetic retaining device having a first polarity and a second polarity;
wherein the magnetic crown and the magnetic core are oriented with respect to each other so that the magnetic crown and the magnetic core repel each other;
wherein the magnetic core and the magnetic retaining device are oriented with respect to each other so that the magnetic core and the magnetic retaining device repel each other; and
wherein the magnetic crown, the magnetic core, and the magnetic retaining device are oriented with respect to each other so that the magnetic core is suspended in mid-air and the magnetic core can freely rotate.

11. The magnetic levitated car of claim 10 wherein each of magnetic crown, the magnetic core, and the magnetic retaining device is a permannent magnet.

12. The magnetic levitated car of claim 10 wherein the magnetic retaining device is a magnetic ring.

13. The magnetic levitated car of claim 10 further comprising
one or more further magnetic suspension stabilizers spacedly disposed from each other and from the first magnetic suspension stabilizer on the car body;
wherein each of the one or more further magnetic suspension stabilizers is comprised of
a magnetic crown having a first polarity and a second polarity;
a magnetic core having a first polarity and a second polarity; and
a magnetic retaining device having a first polarity and a second polarity;
wherein for each of the one or more further magnetic suspension stabilizers, its magnetic crown and its magnetic core are oriented with respect to each other so that its magnetic crown and its magnetic core repel each other;
wherein for each of the one or more further magnetic suspension stabilizers, its magnetic core and its magnetic retaining device are oriented with respect to each other so that its magnetic core and its magnetic retaining device repel each other; and
wherein for each of the one or more further magnetic suspension stabilizers, its magnetic crown, its magnetic core, and its magnetic retaining devices are oriented with respect to each other so that its magnetic core is suspended in mid-air and its magnetic core can freely rotate.

14. The magnetic levitated car of claim 13 further comprising
- a first electromagnetic propulsion device disposed on the car body which can move the magnetic levitated car forward or backward along a magnetic track; and
- one or more further electromagnetic propulsion devices disposed on the car body which can move the magnetic levitated car forward or backward along the magnetic track.

15. The magnetic levitated car of claim 14 wherein
the first electromagnetic propulsion device is comprised of
- four arcuate armature coil sections which together substantially form a circular shape;
- and three commutator housings;
- wherein for the first electromagnetic propulsion device one of the three commutator housings cover each of three of the four arcuate armature coil sections so that one of the four arcuate armature coil sections is not covered by any of the three commutator housings and such that there is a gap located above the arcuate armature coil section which is not covered by one of the three commutator housings and said gap is located between one of the three commutator housings and another of the three commutator housings;
- the one or more further electromagnetic propulsion devices are comprised of
- four arcuate armature coil sections which together substantially form a circular shape;
- and three commutator housings;
- wherein for each of the one or more further electromagnetic propulsion devices one of the three commutator housings cover each of three of the four arcuate armature coil sections so that one of the four arcuate armature coil sections is not covered by any of the three commutator housings and such that there is a gap located above the arcuate armature coil section which is not covered by one of the three commutator housings and said gap is located between one of the three commutator housings and another of the three commutator housings.

16. The magnetic levitated car of claim 13 wherein
the one or more further magnetic suspension stabilizers are disposed on the bottom of the car body.

17. The magnetic levitated car of claim 13 wherein
each of the magnetic crowns, the magnetic cores, and the magnetic retaining devices of each of the first magnetic suspension stabilizer and the one or more further magnetic suspension stabilizers is permanent magnet.

18. The magnetic levitated car of claim 13 wherein
for each of the one or more further magnetic suspension stabilizers, its magnetic retaining device is a magnetic ring.

19. The magnetic levitated car of claim 10 further comprising
- a first electromagnetic propulsion device disposed on the car body which can move the magnetic levitated car forward or backward along a magnetic track.

20. The magnetic levitated car of claim 19 wherein
the first electromagnetic propulsion device is comprised of
- four arcuate armature coil sections which together substantially form a circular shape;
- and three commutator housings, one of the three commutator housings covering each of three of the four arcuate armature coil sections so that one of the four arcuate armature coil sections is not covered by any of the three commutator housings and such that there is a gap located above the arcuate armature coil section which is not covered by one of the three commutator housings and said gap is located between one of the three commutator housings and another of the three commutator housings.

21. A magnetic levitated car according to claim 19, wherein
the first electromagnetic propulsion device can move the magnetic levitated car in an omni-directional manner.

22. The magnetic levitated car of claim 13 wherein
the one or more further magnetic suspension stabilizers are disposed on the bottom of the car body.

23. A magnetic levitated car according to claim 14 wherein
wherein the first electromagnetic propulsion device and the one or more further electromagnetic propulsion devices can move the magnetic levitated car in an omni-directional manner.

* * * * *

UNITED STATES PATENT AND TRADEMARK OFFICE
CERTIFICATE OF CORRECTION

PATENT NO.         : 7,059,252 B2                                      Page 1 of 1
APPLICATION NO.    : 10/499397
DATED              : June 13, 2006
INVENTOR(S)        : Jose L. Guardo, Jr.

It is certified that error appears in the above-identified patent and that said Letters Patent is hereby corrected as shown below:

ON THE TITLE PAGE

Item (73) Assignee should read -- Maglevvision Corporation, Manila (PH) --.

Signed and Sealed this

Thirtieth Day of January, 2007

JON W. DUDAS
*Director of the United States Patent and Trademark Office*